(12) United States Patent
Chen (10) Patent No.: US 7,010,316 B2
(45) Date of Patent: Mar. 7, 2006

(54) METHOD AND APPARATUS FOR MULTI-CHANNEL REVERSE LINK OUTER-LOOP POWER CONTROL

(75) Inventor: Tao Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 538 days.

(21) Appl. No.: 09/967,653

(22) Filed: Sep. 28, 2001

(65) Prior Publication Data

US 2003/0064743 A1    Apr. 3, 2003

(51) Int. Cl.
*H04Q 7/20*    (2006.01)
(52) U.S. Cl. ............... 455/522; 455/69; 455/127.1; 370/318
(58) Field of Classification Search ........... 455/522, 455/69, 67.11, 67.13, 226.1, 68, 127.1; 370/259, 370/335, 331, 318; 375/219, 222, 227
See application file for complete search history.

(56) References Cited

U.S. PATENT DOCUMENTS

| | | | |
|---|---|---|---|
| 5,603,096 A * | 2/1997 | Gilhousen et al. ............ 455/69 |
| 5,604,730 A * | 2/1997 | Tiedemann, Jr. ............ 370/252 |
| 6,169,907 B1 * | 1/2001 | Chang et al. ............... 455/522 |
| 6,173,188 B1 * | 1/2001 | Kim ............................ 455/522 |
| 6,181,738 B1 * | 1/2001 | Chheda et al. ............. 375/224 |
| 6,298,241 B1 * | 10/2001 | Hong ......................... 455/522 |
| 6,373,823 B1 * | 4/2002 | Chen et al. ................. 370/252 |
| 6,418,322 B1 * | 7/2002 | Kim et al. .................. 455/522 |
| 6,549,785 B1 * | 4/2003 | Agin .......................... 455/522 |
| 6,609,008 B1 * | 8/2003 | Whang et al. .............. 455/522 |
| 6,622,024 B1 * | 9/2003 | Koo et al. .................. 455/522 |
| 6,639,934 B1 * | 10/2003 | Engstrom et al. .......... 375/130 |
| 6,690,944 B1 * | 2/2004 | Lee et al. ................... 455/522 |

FOREIGN PATENT DOCUMENTS

| | | |
|---|---|---|
| EP | 1067704 | 1/2001 |
| WO | 0074289 | 12/2000 |
| WO | 0161884 | 8/2001 |

* cited by examiner

*Primary Examiner*—Tilahun Gesesse
(74) *Attorney, Agent, or Firm*—Philip R. Wadsworth; Thien T. Nguyen; George J. Oehling

(57) ABSTRACT

In a disclosed embodiment, a maintain and adjust threshold module determines the desired signal to noise and interference ratio for a first channel. Next, a delta computation module produces a threshold delta, which is then added to a base threshold by way of an adder. The resulting sum is the outer-loop set point that is used in a comparator. The comparator compares a receive signal strength with the outer-loop threshold. The comparator output is inputted to a generate up/down command module. The generate up/down command module sends a down command to the mobile unit if receive signal strength is greater than the outer-loop threshold, otherwise it sends an up command.

21 Claims, 5 Drawing Sheets

METHOD AND APPARATUS FOR MULTI-CHANNEL REVERSE LINK OUTER-LOOP POWER CONTROL

FIELD

The present invention generally relates to wireless communications systems and more particularly to a method and apparatus for reverse link multi-channel outer-loop power control for a CDMA wireless communications system.

BACKGROUND

Code-division multiple access ("CDMA") wireless communications systems offer improved capacity and reliable communications. Capacity of a cellular system is important to cellular service providers because it directly impacts revenue. In general, the capacity of a CDMA wireless communications system is limited by interference. Therefore, it is beneficial to minimize the amount of interference in a CDMA wireless communications system.

Generally, the most significant amount of interference is generated from other mobile units, such as cellular phones, operating within the cell or from neighboring cells. On the reverse link, i.e. transmission from a mobile unit to a base station, a mobile unit in a CDMA wireless communications systems transmits a pseudo-noise ("PN") sequences to the base station. The base station receives this signal as well as other mobile units' transmitted PN sequence. PN sequences have the property that correlation between delayed versions of one sequence are much lower than that between two sequences that are time-aligned, that is, a delayed PN sequence appears as noise to the receiver time-aligned to receive a second PN sequence with a different delay. Thus, a number of mobile units can transmit on the same frequency to the same base station in a CDMA system. A CDMA mobile user's transmitted signal contributes to interference to the transmitted signal of all other users.

Because the signal of each mobile unit interferes with the signals of other mobile units in a typical CDMA cellular environment, an interference problem exists known as the "near-far" problem. To illustrate the near-far problem, consider the case of two mobile units operating in communication with the same base station. Suppose that a first mobile unit is near the base station and has a small path loss and a second mobile unit is far from the base station and has a large path loss. Also, assume that the two mobile units transmit using the same amount of power. Since the two mobile units transmit with the same amount of power but have different amounts of path losses, the base station may receive a weaker signal from the second mobile than the signal from the first mobile unit. In a CDMA system, the transmitted signal of each mobile unit adds interference to all other mobile units. It can be seen then that the first mobile unit becomes a relatively larger interference source to the second mobile unit than the second mobile unit is to the first, as seen from the base station. Thus, a mobile unit close to the base station drowns out the signal of a mobile unit far from the base station. To overcome the near-far problem, CDMA wireless communications systems use power control to control the transmitted power of each mobile unit. In general, CDMA wireless communications systems use three types of power control for the reverse link, open-loop power control, closed-loop power control, and outer-loop power control. In the following, terminology from the IS-2000 standard is used as an example. In open-loop power control, a mobile unit uses the estimated received power from the base station to control its transmitted power. Typically, open-loop power control by itself is insufficient because the forward link (i.e., base station to mobile) and reverse link (i.e., mobile unit to base station) utilize different frequency bands. As such, the shadowing and fading characteristics for the forward link and the reverse link can be different. Thus, CDMA wireless communications systems also use (a) closed-loop power control, which adjusts the transmitted power of a mobile unit so that its received signal to noise and interference ratio at the base station is as close to a desired level as possible; and (b) outer-loop power control which determines what the desired signal to noise and interference ratio is.

In concept, closed-loop power control seeks to adjust the transmitted power of a mobile unit so that its transmitted signal received at the base station is as close to a threshold value as possible. At the base station, the closed-loop power control sends an up/down command to a mobile unit if the closed-loop power control determines that the mobile unit needs to increase or decrease its transmitted power. The closed-loop power control uses the output of the outer-loop power control, i.e. a desired signal to noise and interference ratio called the set point, as the threshold to determine if the mobile units received signal at the base station is too high or too low.

The outer-loop power control is implemented at the base station so that the frame erasure rate ("FER") target or other quality metric is achieved with minimal transmitted power for the channel under control. If the link quality is too low or too high, the base station adjusts the outer-loop set point up or down to achieve the desirable link quality. The adjustment of the outer-loop set point is outer-loop power control.

CDMA wireless communications standards such as IS-2000 offer higher data rates than those of older CDMA standards. In the reverse link of IS-2000, a mobile unit can transmit at higher data rates using one or more Reverse Supplemental Channels ("R-SCHs") in addition to the Reverse Fundamental Channel ("R-FCHs"), which typically is used for lower data rates. R-SCHs operate at different received signal to noise and interference levels from those of the R-FCH.

At lower rates, in general, the mobile unit transmits either on the R-FCH or the Reverse Dedicated Control Channel ("R-DCCH"). The base station observes the FER of the R-FCH or the R-DCCH and adjusts the outer-loop set point based on that FER. When the mobile unit transmits at a higher data rate, it transmits on R-SCH in addition to R-FCH, R-DCCH, or both.

As mentioned previously, the R-SCH in general operates at different received signal to noise and interference levels from that of the R-FCH or R-DCCH. This, in turn, affects the base station's optimal level of the received signal to noise and interference ratio for the R-Reverse Pilot Channel ("R-PICH"). The base station uses a different outer-loop set point on the R-PICH received signal to noise and interference ratio when the mobile transmits on the R-SCH. In order to adjust the outer-loop set point when R-SCH is used, one method is for the base station to observe the FER or other decoder metrics of the R-SCH and use that in the outer-loop to adjust the outer-loop set point However, there are several problems with observing the FER of the R-SCH to adjust the outer loop set point. One problem is that the mobile unit, in general, is only allowed to transmit on the R-SCH for a limited duration. That limited duration does not provide enough observation time to generate meaningful FER statistics that are necessary for finetuning the outer-loop set point. Another problem is that the transmission of R-SCH can be abruptly terminated by the mobile unit. For example, the mobile unit may not have adequate amount of RF power or any more data to transmit on the R-SCH(s). As a result of this unscheduled termination of transmission on the R-SCH(s), the estimate of the FER becomes difficult at the base station. Even when the termination of the R-SCH transmission occurs according to a pre-arranged schedule, the outer-loop power control has to switch back and forth between the R-SCH and the R-FCH or the R-DCCH. If the outer-loop on either R-FCH or R-DCCH has not been updated, such transitions can create a period of settlement where an otherwise unnecessary large transmit power would be needed to maintain the link quality on R-FCH or R-DCCH. Similar loss of efficiency happens when the outer-loop transitions to the decoder(s) of the R-SCH(s).

In parallel with the outer-loop set point for R-SCH, similar problems can exist for the R-DCCH due to its bursty transmissions. That is, the outer-loop power set point might not settle at the right level if frequent transmissions do not occur in the underlying channel. When only the R-DCCH is used in addition to the R-PICH on the reverse link of a mobile unit, there is a need to raise the received pilot to noise and interference ratio to compensate for the fact that the outer-loop set point is not subject to frequent updates. Since the IS-2000 standard defines a fixed traffic to pilot ratio for both R-FCH and R-DCCH regardless of their likely transmission duty cycles, the need to adjust the pilot reference ratio only for the R-DCCH must be resolved.

Unless novel techniques are used for the outer-loop power control when a mobile unit transmits using a plurality of channels, a mobile unit may transmit more power than needed for the desired link reliability. This, in turn, may reduce battery life for a mobile unit and decrease the reverse link capacity of the cellular system. There is therefore need in the art for outer-loop power control when a mobile unit transmits using multiple channels. Also, it is desirable to have a low complexity solution in resolving the outer-loop power control problem, especially in fast time-to-market conditions. A simple solution reduces the tuning needed, lowers the possibility of mistakes in implementation, and increases the robustness of the system under unexpected operating conditions. In addition, a solution that can be implemented with minimal changes to hardware and software reduces the design time, which consequently reduces engineering costs.

SUMMARY

Embodiments disclosed herein address the above stated needs by providing target signal to noise and interference ratios for a mobile unit transmitting on multiple channels on the reverse link in a CDMA wireless communications system.

The presently disclosed embodiments are directed to method and apparatus for outer-loop power control when a mobile unit transmits using multiple channels. According to one aspect of the present invention, a maintain and adjust threshold module accepts input from the decoder of a first channel and outputs the correct base set point on Reverse Pilot Channel that drives the closed-loop power control in single channel operation. Next, a delta computation module produces a threshold delta, which is then added to the base threshold. The resulting sum is the outer-loop set point that is used in a comparator during multiple channel operations on the reverse link. The comparator compares a receive signal strength with the outer-loop set point. The comparator output is inputted to a generate up/down command module. The generate up/down command module sends a down command if receive signal strength is greater than the outer-loop set point, otherwise it sends an up command.

DETAILED DESCRIPTION

The presently disclosed embodiments are directed to method and apparatus for multi-channel reverse link outer-loop power control. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed descriptions are directed to merely exemplary embodiments of the invention. To maintain brevity, other embodiments of the invention which use the principles of the present invention are not specifically described in the present application and are not specifically illustrated by the present drawings. The word "exemplary" is used exclusively herein to mean "serving as an example, instance, or illustration." Any embodiment described herein as "exemplary" is not necessarily to be construed as preferred or advantageous over other embodiments.

Figure 1:
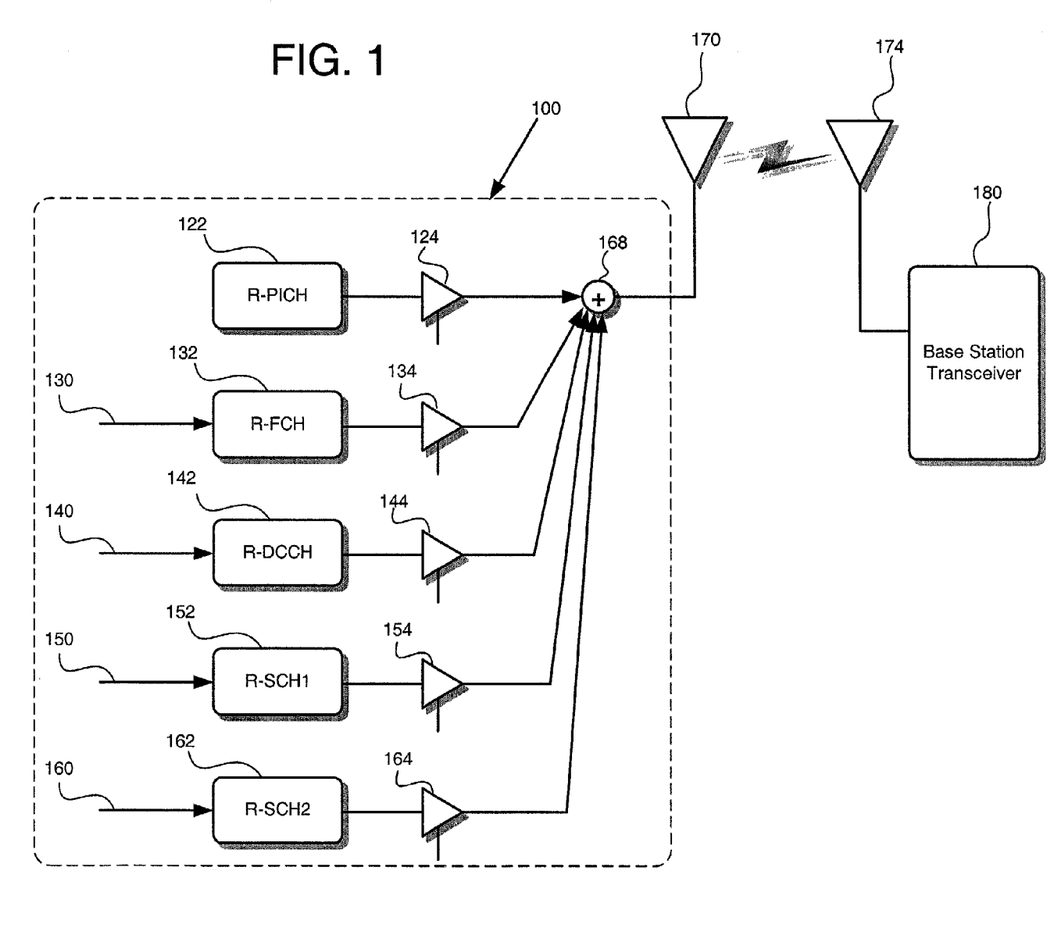
FIG. 1 illustrates reverse link physical layer channels.

FIG. 1 illustrates the reverse link physical layer channels that a mobile unit 100 may transmit on to communicate with base station 180 for an IS-2000 based cellular system. Although only a portion of a typical mobile unit is shown in mobile unit 100, it will be referred to as mobile unit 100 in the present application.

The physical layer is the portion of the communications protocol responsible for transmission and reception. The physical layer is comprised of several channels. Only a subset of the reverse link physical layer channels is shown in mobile unit 100. Mobile unit 100 may send data to R-FCH input 130, R-DCCH input 140, R-SCH1 input 150, or R-SCH2 input 160. Mobile unit 100, in general, transmits using R-FCH 132, R-DCCH 142, or both. When mobile unit 100 needs to transmit data at a higher rate, it may transmit on a Supplemental Channel, such as R-SCH1 152 and/or R-SCH2 162, in addition to using R-FCH 132 or R-DCCH 142. Physical layer channels R-FCH 132, R-DCCH 142, R-SCH1 152, and R-SCH2 162 are also referred to as "reverse link traffic channels."

Mobile unit 100 uses Reverse Pilot Channel ("R-PICH") 122 to provide a phase reference and signal quality estimation for coherent demodulation and multi-path combining at base station 180. R-PICH 122 is an unmodulated signal and does not carry data. R-PICH 122 also provides a means for base station 180 to measure received signal strength. The received signal strength measurement can be used for reverse link power control.

Each physical channel has its own gain relative to R-PICH applied to it prior to transmission, as shown by amplifiers 124, 134, 144, 154, and 164. During operation, mobile unit 100 must maintain the power levels of each channel by applying the appropriate gain factors to amplifiers 124, 134, 144, 154, and 164. In general, the power levels of the traffic channels and control channels are maintained to be constants relative to the gain of reverse link pilot channel 122. These ratios are also referred to as the "traffic to pilot ratios."

When supporting one reverse link channel at a time, the required received pilot channel signal to noise and interference level depends on the data rate, the frame length, the FEC (forward error-correcting coding), the desired link quality, the fading scenario, the antenna diversity at the mobile unit and the base station, as well as other factors. As a result, the IS-2000 standard chose a single value for the R-PICH received signal to noise and interference ratio that was proper for the general situation as the operating point for each combination of the data rate, frame length, FEC and target FER. These received levels of pilot, when expressed relative to that required by the 9600 bps, 20-ms, convolutionally encoded R-FCH/RDCCH operating at 1% FER are referred to as "pilot reference levels." These traffic-to-pilot ratios for these combinations are also specified in IS-2000. In general, base station transceiver 180 tunes the pilot reference levels of each traffic and control channel to a specific level to maintain a certain FER.

The outputs of gains 124, 134, 144, 154, and 164 are then added by adder 168 and transmitted by mobile unit antenna 170. The transmitted signal of mobile unit 100 is received by base station antenna 174 and processed by base station transceiver 180.

CDMA wireless systems, such as those using the IS-2000 standard, control the transmitted power of mobile unit 100. By measuring the received signal strength of mobile unit 100 and sending out a feedback to mobile unit 100, base station 180 operates the reverse link closed-loop power control. In one embodiment, the feedback to mobile unit 100 is in a sequence of up and down commands.

If the received power from mobile unit 100 is too high, then base station 180 issues a power down command to the mobile unit 100. Conversely, if the received power from mobile unit 100 is too low, then base station 180 issues a power up command to mobile unit 100. The power up and power down commands are typically in increments or decrements of 1 dB, but can also be of different sizes. Base station 180 determines if an up or down command should be issued by measuring the received signal to noise and interference power ratio and comparing it with the outer-loop set point. In addition, feedbacks in other forms can also be used. In one exemplary embodiment, the feedback provides the actual amount of correction for the mobile station 100 to change its output power. That is, the feedback contains both a sign and a magnitude. As mentioned previously, outer-loop power control continually maintains and adjusts the outer-loop set point to obtain a target FER or other desired quality metric for the channel.

Figure 2:
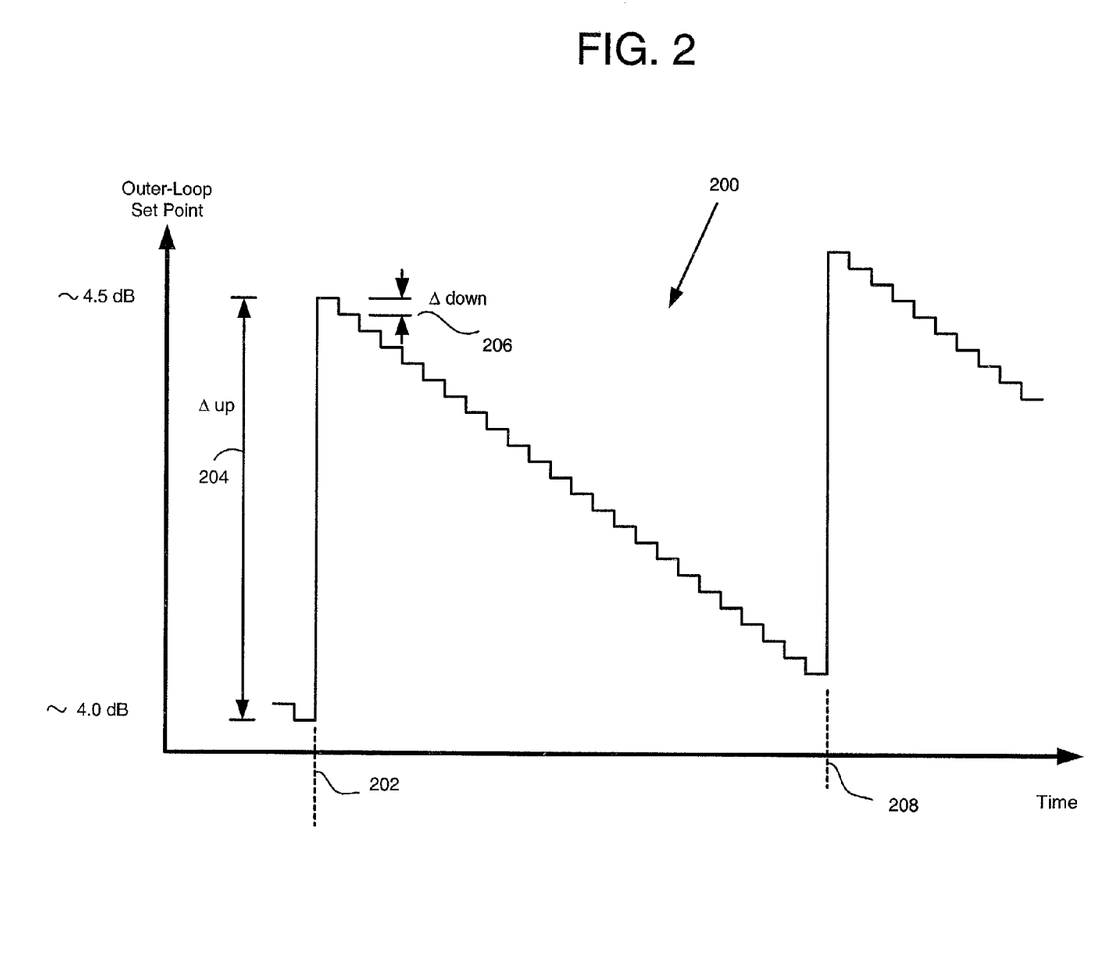
FIG. 2 illustrates the adjustments made to a outer-loop set point over time.

An example of how the outer-loop adjustments 200 are made over time is illustrated in FIG. 2. The plot of FIG. 2 illustrates the outer-loop set point adjustment over time. At time 202, an erasure is detected by base station 180. This erasure causes the frame erasure rate to increase. If the frame erasure rate is too high at time 202, then the outer-loop power control increases the set point by Δ up 204. In general, Δ up 204 is larger than Δ down 206 so that base station 180 can increase the outer-loop set point rapidly in the event that FER increases. During time 202 to time 208, base station 180 does not detect erasures and gradually lowers the outer-loop set point by Δ down 206. One example of the range of adjustments to the outer-loop set point could be from 4.0 dB to 4.5 dB as shown in FIG. 2. In another example, a maintain and adjust threshold module modifies the base threshold, i.e. the set point, according to the decoding result of the R-FCH, the R-DCCH, or both. When the decoding is successful and the decoder metrics show a very high level of confidence, the threshold is reduced. When the decoding is unsuccessful and the decoder metrics show a low level of confidence, the threshold is increased.

Expanding the example in FIG. 2, outer-loop power control can be based on the FER of R-FCH 132. When mobile unit 100 transmits using R-FCH 132 or R-DCCH 142 and transmits on a R-SCH as well, mobile unit 100 is considered to be transmitting on a plurality of channels. Note that the following explanation uses the existence of R-SCH(s) together with R-FCH or R-DCCH to illustrate the present invention. Other applications, including the need to adjust the outer-loop set point when both R-FCH and R-DCCH are present can be inferred from this example. When mobile unit 100 is transmitting on a plurality of channels, the base station can use the FER of the R-SCH to maintain and adjust the outer-loop set point. However, this method has the problems mentioned previously. One embodiment uses the FER or other link quality metric of the R-FCH or the R-DCCH to maintain and adjust the outer-loop set point when mobile unit 100 is transmitting on a plurality of channels.

Figure 3:
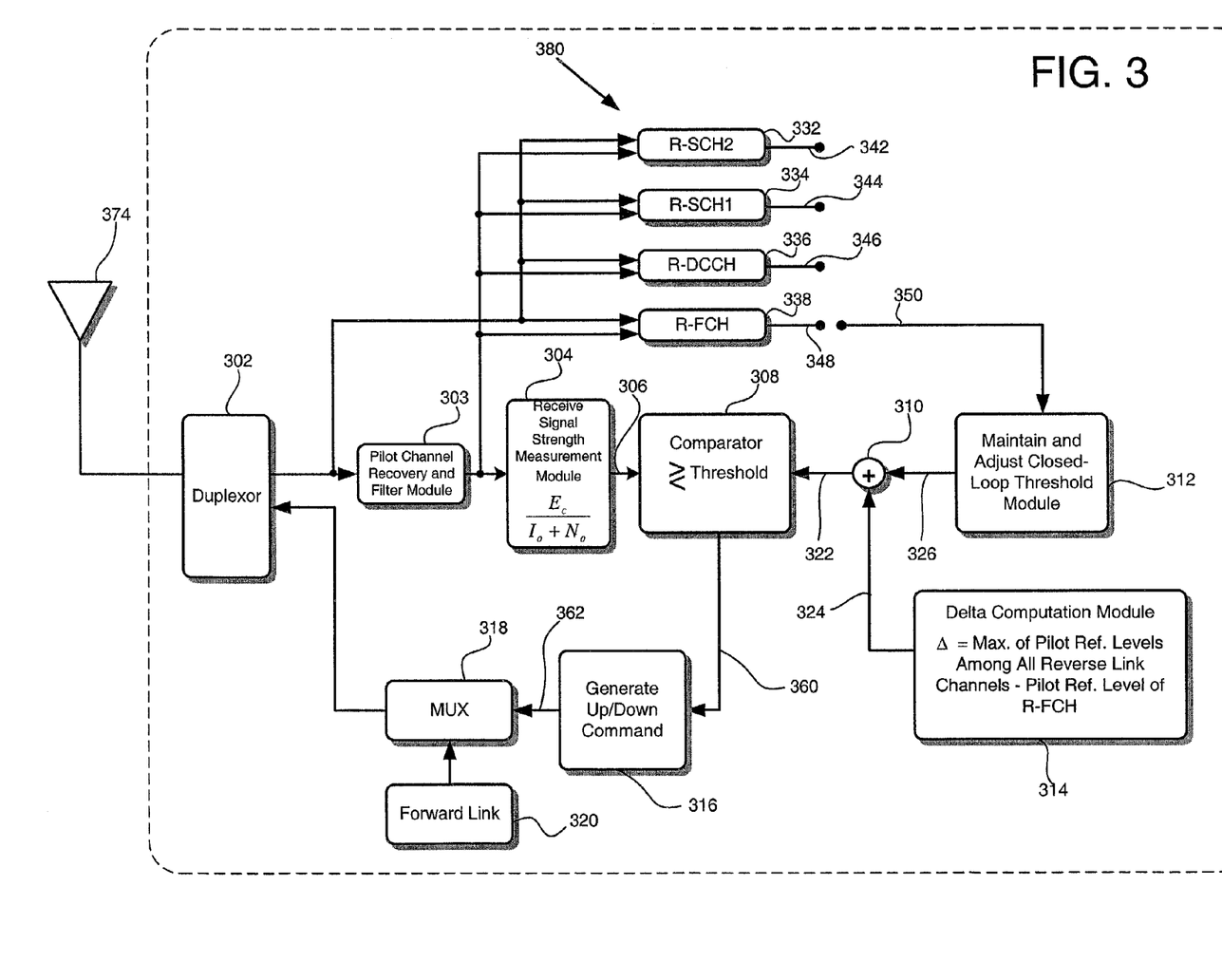
FIG. 3 illustrates an exemplary base station detailing outer-loop power control.

In FIG. 3, exemplary system 380 details portions of base station 180 for the closed-loop and outer-loop power control. Although system 380 illustrates only a portion of an actual base station, it will be referred to as base station 380 in the present application. Note that in order to simplify the drawing, many other functions, including diversity receiving antennas, rake receivers, and their connections are not shown in FIG. 3.

Exemplary base station 380 receives the reverse link signal from mobile unit 100 by way of base station antenna 374. Duplexor 302 is coupled to base station antenna 374, so that base station antenna 374 can be used for receiving and transmitting signals. Output of duplexor 302 provides input to "pilot channel recovery and filter module" 303 which provides input to the individual channel receivers 332, 334, 336, 338, as well as "receive signal strength measurement module" 304. Receive signal strength 306 is coupled to input of comparator 308.

Comparator 308 also accepts an input from adder 310. Adder 310 adds "base threshold" 326 from "maintain and adjust closed-loop threshold module" 312 and "threshold delta" 324 from "delta computation module" 314. Output of adder 310 provides "outer-loop set point" 322 for comparator 308. Comparator output 360 is coupled to input of "generate up/down command module" 316. Generate up/down command module 316 supplies "up/down command" 362 that is multiplexed with "forward link data" 320 by way of MUX 318. Output of MUX 318 is coupled to input of duplexor 302 for forward link transmission.

"Maintain and adjust closed-loop threshold input" 350 can accept the FER or other decoder metrics from one of the reverse link physical layer traffic channels or control channels, such as R-FCH 348, R-DCCH 346, R-SCH1 344, or R-SCH2 342. FER and other decoder metrics of R-FCH 348 are produced by R-FCH demodulator-decoder 338. Similarly, FER and other decoder metrics of R-DCCH 346, R-SCH1 344, and R-SCH2 342 are produced by demodulator-decoders 336, 334, and 332, respectively. Demodulator-decoders 332, 334, 336, 338 receive input from output of duplexor 302 as well as from pilot channel recovery and filter module 303.

The reverse link closed-loop power control seeks to adjust the transmit power of mobile unit 100 so that the received signal strength is close to outer-loop set point 322. In one embodiment, the reverse link closed-loop power control adjusts the power transmitted by mobile unit 100 via an up/down command. Base station 380 sends an up command to mobile unit 100 if receive signal strength 306 is less than or equal to outer-loop set point 322 as determined by comparator 308. Otherwise, base station 380 sends mobile station 100 a down command when receive signal strength 306 is greater than outer-loop set point 322 as determined by comparator 308.

In the reverse link closed-loop power control, the receive signal strength measurement module 304 measures and outputs receive signal strength 306 by estimating $$\frac{E_c}{I_o + N_o},$$

where $E_c$ is the pilot energy per chip, $I_o$ is the interference power spectral density and $N_o$ is the noise power spectral density.

The outer-loop power control maintains and adjusts base threshold 326 that is used by the closed-loop power control. The outer-loop power control adjusts base threshold 326 for the closed-loop power control to maintain a target FER or other link quality for the channel or channels that are present more persistently. In this example, these are the R-FCH or the R-DCCH. In one embodiment, maintain and adjust closed-loop threshold module 312 operates as follows: If the FER happens to increase, maintain and adjust closed-loop threshold module 312 increases base threshold 326 by Δ up 204. Otherwise, if the FER happens to decrease, maintain and adjust closed-loop threshold module 312 lowers base threshold 326 by Δ down 206.

When mobile unit 100 is transmitting on the R-FCH, the R-DCCH, or both the R-FCH and the R-DCCH, base threshold 326 is used as the outer-loop set point directly to drive the closed-loop power control. This is done in FIG. 3 by setting threshold delta 324 equal to zero.

When mobile unit 100 is transmitting on a plurality of channels, FER of R-FCH 348 or FER of R-DCCH 346 is coupled to maintain and adjust closed-loop threshold input 350. Generally, in IS-2000, mobile unit 100 transmits on R-FCH 348 and R-DCCH 346 more frequently and regularly than it transmits on R-SCH1 344 or R-SCH2 342 since their availability is contingent on the available cellular system resources. Typically, mobile unit 100 transmits on R-SCH1 344 or R-SCH2 342 when the mobile unit receives authorization by base station 380 after making a request. As a result, base station 380 is aware of the scheduled beginning and end of the R-SCH1 or R-SCH2 transmissions. By using the FER of R-FCH 348 or FER of R-DCCH 346 as an input to maintain and adjust closed-loop threshold module 312, the system shown in FIG. 3 overcomes the limitation of insufficient statistics for FER provided by R-SCH1 demodulator 334 and R-SCH2 demodulator 332.

As mentioned previously, for the IS-2000 reverse link in general, each type of channel is assigned to a specific transmit power level relative to the transmit power level of R-PICH 122. Also, the transmit power level relative to the transmit power level of R-PICH 122 varies according to the desired FER and other factors. In general, the desired FER of R-SCH1 152 (R-SCH1 344 in FIG. 3) and R-SCH2 162 (R-SCH2 342 in FIG. 3) in IS-2000 is 5%, while the desired FER of R-FCH 132 (R-FCH 348 in FIG. 3) and R-DCCH 142 (R-DCCH 346 in FIG. 3) is 1%.

Since the data rates are different, R-SCH1 152 (R-SCH1 344 in FIG. 3) and R-SCH2 162 (R-SCH2 342 in FIG. 3) transmit with different pilot reference levels than those for R-FCH 132 (R-FCH 348 in FIG. 3) and R-DCCH 142 (R-DCCH 346 in FIG. 3). That is, receive signal strength 306 should be different when mobile unit 100 transmits on a plurality of channels. Thus, when mobile unit 100 transmits on a plurality of channels, base station 380 cannot readily use the same outer-loop set point used when mobile unit 100 is not transmitting on a plurality of channels, i.e., when data being sent on R-FCH 338, R-DCCH 336, or both but not on the R-SCH1 334 or R-SCH2 332. Therefore, base threshold 326 produced by maintain and adjust closed-loop threshold module 312 is not readily usable because of the different desired receive R-PICH signal strength 306 when mobile unit 100 transmits on a plurality of channels.

In order to properly account for the different data rates, desired FER, and desired received signal strength when mobile unit 100 transmits on a plurality of channels, base station 380 adds threshold delta 324 to base threshold 326. Threshold delta 324 is supplied by delta computation module 314. Delta computation module 314 determines $$\text{threshold delta} = \begin{pmatrix} \text{maximum of pilot reference levels} \\ \text{of the reverse link traffic channels} \end{pmatrix} - (\text{pilot reference level of R-FCH}),$$

where the maximum of pilot reference levels is the highest pilot reference level required by all the simultaneously transmitted reverse link physical layer traffic channels by mobile unit 100. Threshold delta 324 is added to base threshold 326 by adder 310 to form outer-loop set point 322. Threshold delta 324 is used to compensate for the difference in the pilot to traffic power ratios between R-FCH 348 and R-SCH1 344 and R-SCH2 342 when the mobile unit is transmitting on a plurality of channels. Threshold delta 324 is only added to base threshold 326 when the mobile unit is transmitting on a plurality of channels. Otherwise, when the mobile unit is transmitting on a single channel, base station 380 sets threshold delta 324 to zero, or alternatively does not add it to base threshold 326. Again, since base station 380 is aware of the scheduled beginning and end of the R-SCH1 or RSCH2 transmissions, the system in FIG. 3 is also capable of freely switching between threshold delta 324 set to zero and threshold delta 324 not set to zero when the R-SCH1 or RSCH2 transmissions begin and end. There would be little loss of efficiency when this switching occurs in the present invention.

Figure 4:
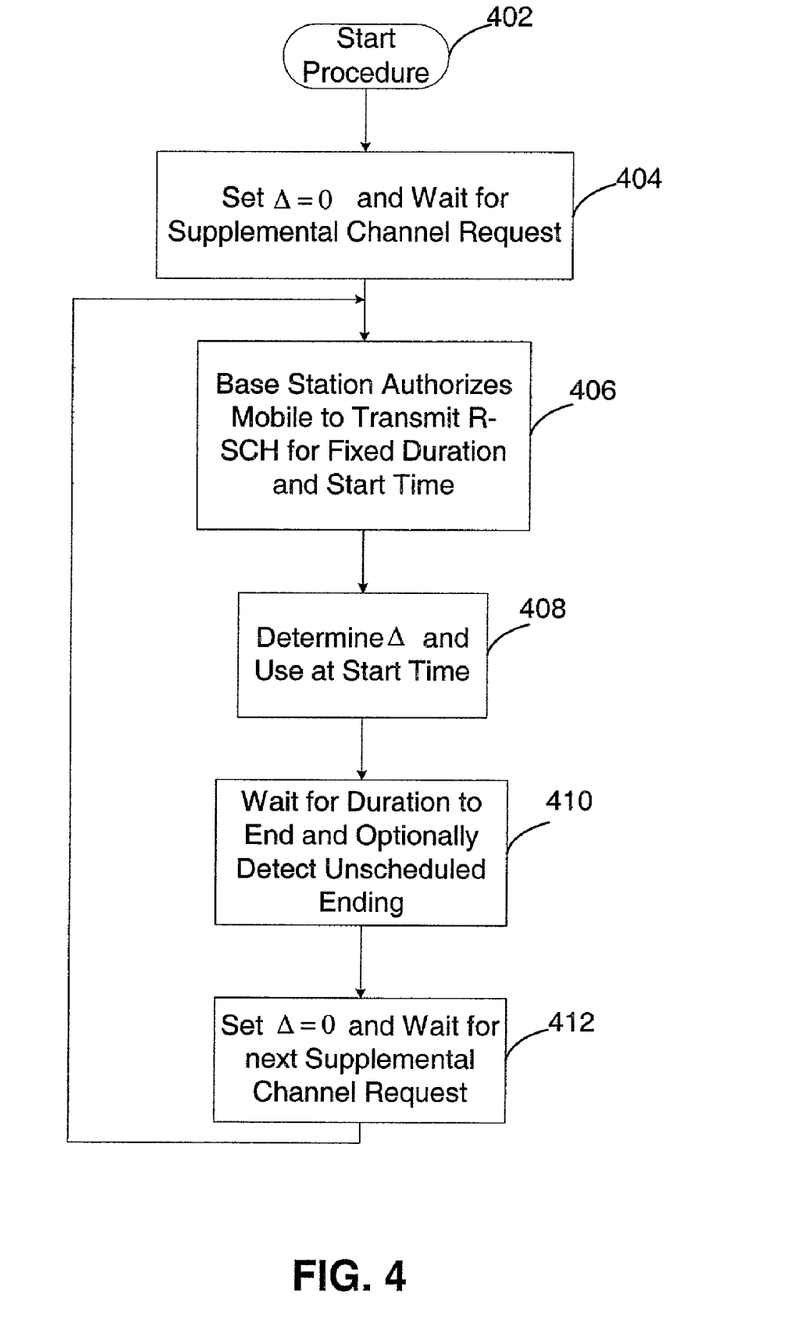
FIG. 4 illustrates a flowchart detailing operation of an exemplary outer-loop power control.

FIG. 4 illustrates a flowchart of according to an embodiment of the present invention. Base station 380 starts the procedure at 402. In step 404, base station 380 sets threshold delta 324 to zero, base station 380 then waits for next R-SCH1 or R-SCH2 request from mobile station 100. Once a request for transmission on R-SCH1 or R-SCH2 is received, base station 380 proceeds to step 406.

In step 406, base station 380 authorizes mobile unit 100 to transmit on R-SCH1 or R-SCH2, such as R-SCH1 152 (R-SCH1 344 in FIG. 3) or R-SCH2 162 (R-SCH2 342 in FIG. 3), for a fixed duration and start time. Base station 380 then proceeds to step 408.

In step 408, base station 380 determines threshold delta 324 to use at start time by way of delta computation module 314. Step 408 is presented in more detail in the flowchart of FIG. 5. Threshold delta 324 and base threshold 326 are added together by adder 310 to form outer-loop set point 322.

In step 410, base station 380 continues to use outer-loop set point 322 until the fixed duration ends. In the mean time, base station 380 can optionally detect the end of transmission on the authorized R-SCH1 or R-SCH2. Once the duration ends, or an end is detected before the scheduled duration, base station 380 proceeds to step 412.

In step 412, base station 380 sets threshold delta 324 to zero and waits for the next supplemental traffic channel request. Upon receiving a request for supplemental traffic channel, such as R-SCH1 152 (R-SCH1 344 in FIG. 3) or R-SCH2 162 (R-SCH2 342 in FIG. 3), base station 380 proceeds to step 406.

Figure 5:
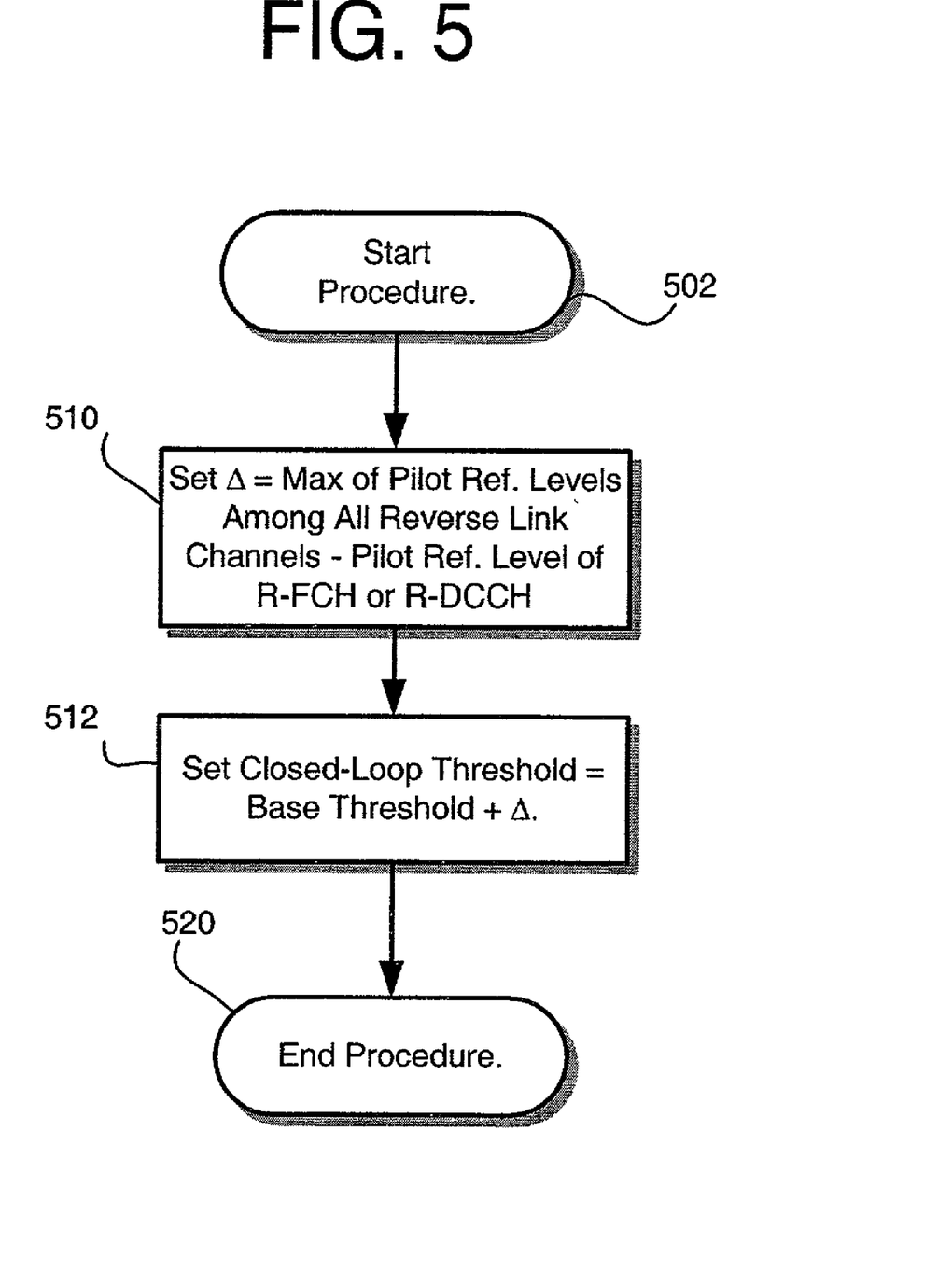
FIG. 5 illustrates a flowchart detailing an exemplary outer-loop control utilizing the pilot reference level difference to change the effective outer-loop set point when multiple channels are present.

FIG. 5 illustrates a flowchart of another embodiment that illustrates step 408 in more detail. The procedure begins at step 502. In step 510, delta computation module 314 determines threshold delta 324. Threshold delta 324 is equal to the maximum pilot reference level of all currently active reverse traffic channels minus the pilot reference level of R-FCH 132 (R-FCH 348 in FIG. 3) or R-DCCH 142 (R-DCCH 346 in FIG. 3).

In step 512, threshold delta 324 is added to base threshold 326 to produce outer-loop set point 322. Outer-loop set point 322 is then used by comparator 308.

Base station 380 proceeds to the end of the procedure at step 520. Note that in the case of making outer-loop set point adjustments between the periods of having R-FCH and having only R-DCCH, "Pilot Reference Level of R-FCH or R-DCCH" in step 510 is replaced by "Pilot Reference Level of R-FCH" due to the R-FCH requirement for continuous transmission.

Thus, in the manner described above, the invention provides method and apparatus for multi-channel reverse link outer-loop power control. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a mobile unit, base station transceiver, or satellite transponder. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Thus, method and apparatus for multi-channel reverse link outer-loop power control have been described.

What is claimed is:

1. A receiver in a wireless communications system including a reverse link fundamental channel and a reverse link supplemental channel, said receiver comprising:
    a delta computation module configured to produce a threshold delta;
    a maintain and adjust threshold module configured to accept a frame erasure rate from said reverse link fundamental channel;
    an adder configured to generate an outer-loop set point by adding a base threshold outputted by said maintain and adjust threshold module to said threshold delta outputted by said delta computation module;
    a comparator configured to compare said outer-loop set point with a receive signal strength, an output of said comparator being utilized to adjust a transmit power of a mobile unit.

2. The receiver of claim 1 wherein said maintain and adjust threshold module is configured to accept said frame erasure rate from a reverse link dedicated control channel.

3. The receiver of claim 1 further comprising a generate up/down command module utilizing said output of said comparator to adjust said transmit power of said mobile unit.

4. The receiver of claim 1 wherein said threshold delta is substantially equal to a pilot reference level of a channel minus a pilot reference level of said reverse link fundamental channel.

5. The receiver of claim 1 wherein said threshold delta is set to zero when said reverse link supplemental channel is not received.

6. The receiver of claim 1 wherein said receive signal strength is outputted by a receive signal strength measurement module.

7. The receiver of claim 6 wherein said receive signal strength measurement module estimates a signal strength of a reverse link pilot channel.

8. The receiver of claim 1 wherein said maintain and adjust threshold module raises said base threshold by a $\Delta$ up when a frame erasure occurs.

9. The receiver of claim 1 wherein said maintain and adjust threshold module lowers said base threshold by a $\Delta$ down when a frame erasure does not occur.

10. The receiver of claim 1 wherein said maintain and adjust threshold module stores said base threshold.

11. A method for generating a target signal to noise and interference ratio in a receiver, said method comprising steps:
   detecting a frame erasure from a reverse link fundamental channel;
   measuring a frame erasure rate;
   maintaining and adjusting a base threshold;
   determining a threshold delta;
   adding said threshold delta to said base threshold to produce a outer-loop set point.

12. The method of claim 11 further comprising a step of comparing a receive signal strength with said outer-loop set point.

13. The method of claim 12 further comprising a step of sending an up command to a mobile unit when said receive signal strength is less than said outer-loop set point.

14. The method of claim 12 further comprising a step of sending a down command to a mobile unit when said receive signal strength is greater than said outer-loop set point.

15. The method of claim 12 wherein said receive signal strength is determined from a reverse link pilot channel.

16. The method of claim 11 wherein said threshold delta is substantially equal to a pilot reference level of a maximum rate channel minus a pilot reference level of said reverse link fundamental channel.

17. The method of claim 11 wherein said detecting step comprises detecting said frame erasure from a reverse link dedicated control channel.

18. The method of claim 11 further comprising a step of determining when a mobile unit is transmitting using a plurality of channels.

19. The method of claim 18 wherein said threshold delta is set to zero when said mobile unit is not transmitting using said plurality of channels.

20. The method of claim 11 wherein said maintaining and adjusting threshold step comprises a step of raising said base threshold by a $\Delta$ up when said frame erasure is detected.

21. The method of claim 11 wherein said maintaining and adjusting threshold step comprises a step of lowering said base threshold by a $\Delta$ down when said frame erasure is not detected.

* * * * *